United States Patent Office 2,796,592
Patented June 18, 1957

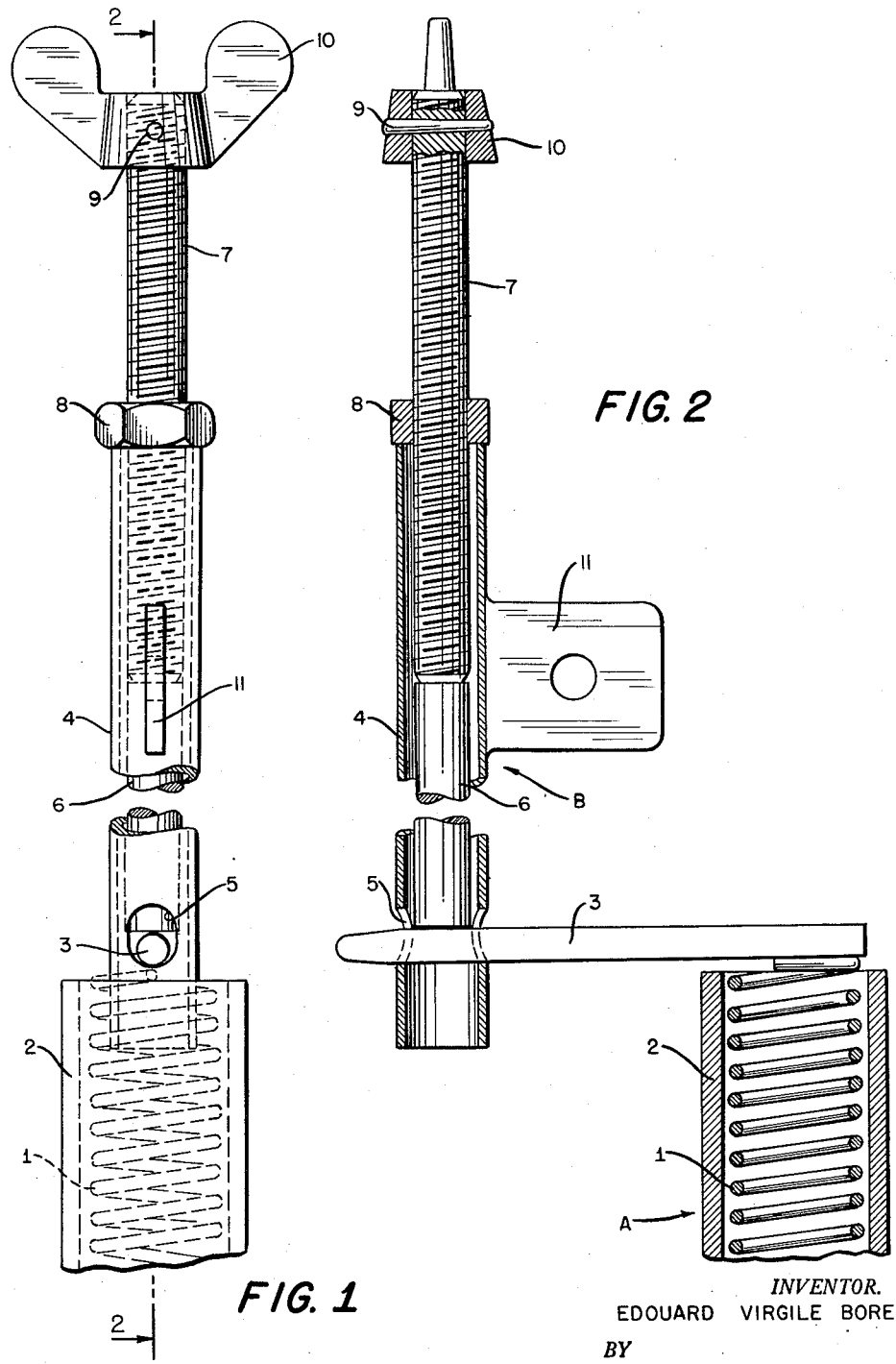

2,796,592

CONNECTING DEVICE FOR HEATING BODY

Edouard Virgile Borel, Vevey, Switzerland, assignor to Societe Anonyme des Manufactures de Glaces et Produits Chimiques de Saint-Gobain, Chauny et Cirey, Paris, France Application November 30, 1954, Serial No. 472,086

Claims priority, application Switzerland December 3, 1953

2 Claims. (Cl. 339—109)

The present invention relates to connecting devices for detachable heating bodies and especially for such bodies as are used in glass melting furnaces and more particularly in the compartment of such furnaces from where sheet glass is drawn from a molten glass batch.

One object of the invention is to provide an improved device permitting to replace rapidly and easily the electrical heating bodies at the end of a working period of say several days.

Another object of the invention is to provide an improved connecting device capable to pass through very thick walls and able to be connected and disconnected rapidly.

According to the invention the connecting device comprises, for the tightening of the connector end exposed to the heat, a means located so as to remain always cold, all securing parts being used as electrical conductors for feeding the current to the heating body.

Other objects and advantages of the invention will become more apparent in the course of the following description.

In order to make the invention more clearly understood we shall now describe, by way of example, a preferred embodiment, especially intended for glass sheets drawing devices and with reference to the accompanying drawing in which:

Fig. 1 is a front view, and

Fig. 2 is a longitudinal section through line 2—2 of Fig. 1.

In the drawing, A represents the heating body comprising a metal spiral 1 enclosed in a refractory tube 2 and fixed to a contact rod 3 of greater diameter and/or of greater electrical conductivity.

The heating body A being placed in operative position, the rod 3 is connected with the electrical circuit by a device B made of a stainless steel tube 4 provided at the end which is exposed to the heat with a transverse hole 5 in which the rod 3 can be engaged, such introduction being facilitated by the oval shape of the hole 5 (longer than wide).

A rod 6 generally solid and preferably made of inoxidisable metal is located inside the tube 4 and extends throughout the greater part of the length of the tube 4. The rod 3 resting on the edges of hole 5 by pressure of rod 6 constitutes the connection exposed to heat. The tightening of this connection is effected by a means distant from the heated part and remaining always cold; this means comprises a threaded spindle 7 cooperating with a nut 8 welded to the other end of tube 4. A wing nut 10 is screwed and keyed with a cross pin 9 on the threaded spindle 7.

The spindle 7 and the adjoining parts being outside the furnace are always relatively cold consequently the tightening or loosening of these parts may be carried out rapidly and easily.

Tube 4 is provided, near the threaded nut 8, with a lateral projection 11 for connecting of the feeding cable from the network or distribution transformer.

A feature of the invention is that all parts cooperating to the tightening action i. e. tube 4, nut 8, part of spindle 7 inside the tube and rod 6, serve as electrical conductors for leading electrical current to the heating body A.

It must be understood that the form of the invention herewith shown and described is to be considered as its preferred embodiment, and that various changes in shape, size and arrangement of parts may be effected without departing from the spirit of the invention or the scope of the subjoined claims.

What I claim is:

1. A connection for introducing current to electric heating means of a furnace, such as resistors and electrodes comprising heating means inside the furnace having a spike projecting therefrom and electrically connected thereto, a sleeve penetrating the furnace wall having an aperture extending transversely therethrough receiving the spike and having connecting means for a source of power, pin means penetrating the sleeve and engaging the spike, and means to adjust the position of the pin means to force the spike against the aperture walls.

2. A connection for introducing current to electric heating means, such as resistors and electrodes of a furnace, said heating means having a rod projecting therefrom and electrically connected thereto, a sleeve adapted to be mounted in and to pass through the furnace wall, the sleeve having an aperture through at least one wall thereof receiving the rod within the furnace, the sleeve having a longitudinally extending screw threaded part outwardly of the furnace, and screw threaded pin means mounted in the screw threaded part of the sleeve, the pin extending within the sleeve and being adapted to force the rod against the side of the aperture.

References Cited in the file of this patent

UNITED STATES PATENTS 2,304,807   Donoghue _____ Dec. 15, 1942